Patented June 21, 1938

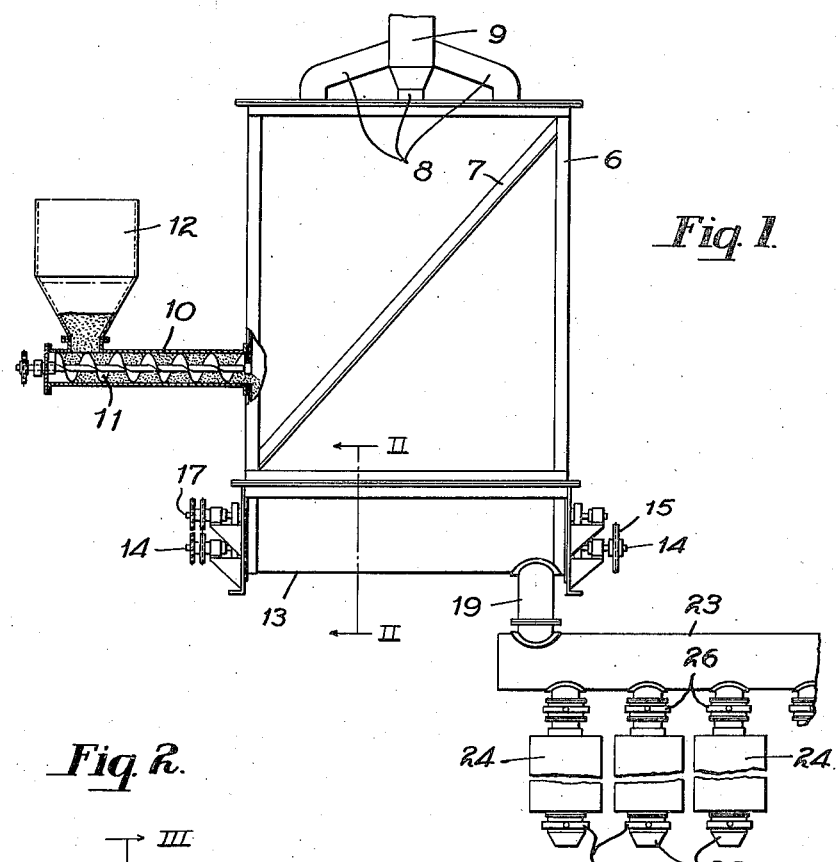
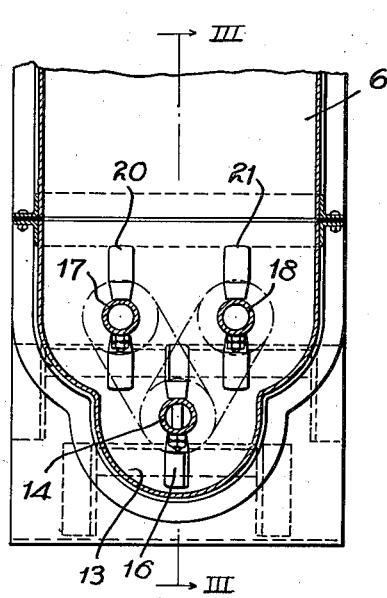
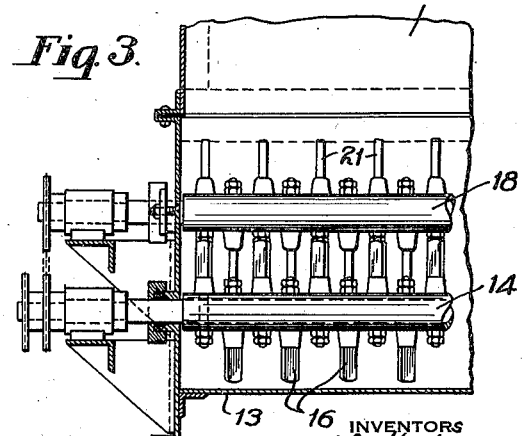

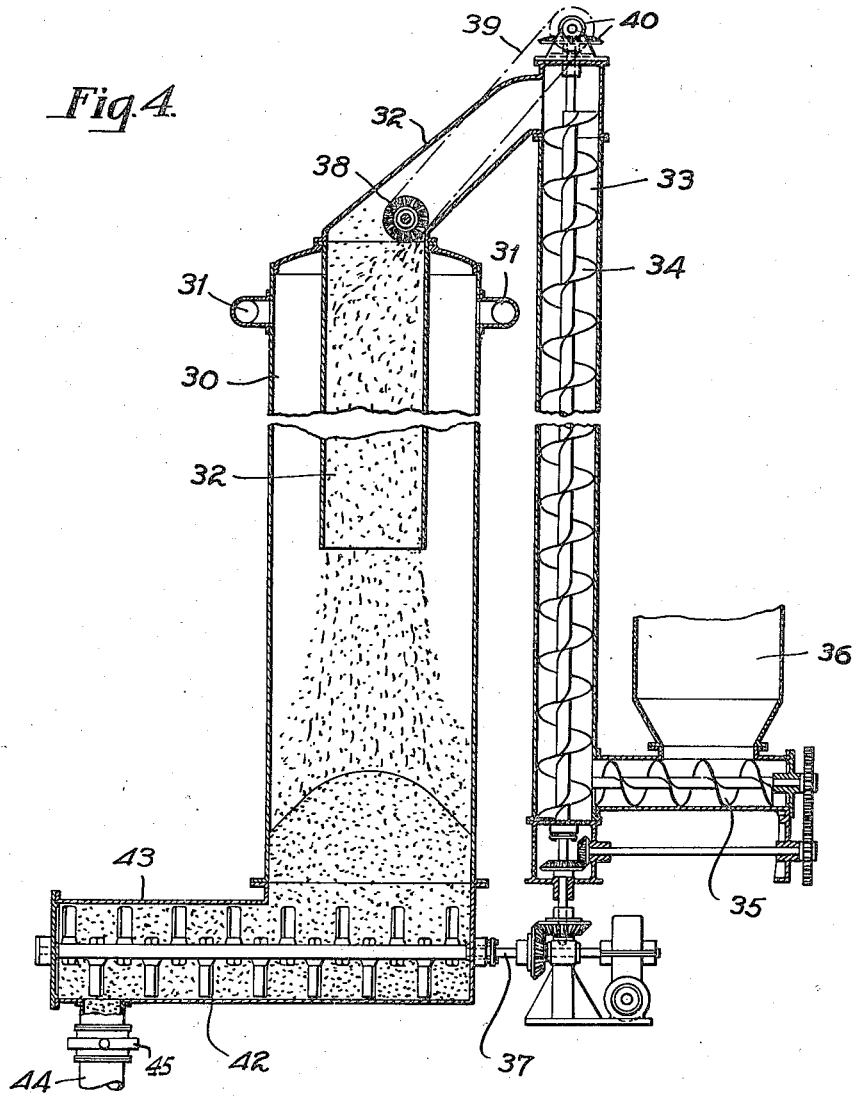

2,121,633

UNITED STATES PATENT OFFICE 2,121,633

METHOD OF TREATING CARBON BLACK

Joseph Hartman, Pittsburgh, Pa., and William A. Knapp, Monroe, La., assignors to Imperial Oil & Gas Products Company, Pittsburgh, Pa., a corporation of West Virginia Application March 25, 1935, Serial No. 12,964

5 Claims. (Cl. 134—60)

Our invention relates to the treatment of carbon black, and more particularly to the treatment of carbon black when in its natural or fluffy condition, so that it can be more conveniently handled.

Carbon black in its natural condition is very light and fluffy and occupies a large space compared to the actual amount of the material. In most cases, carbon black of a given bulk will contain 83% or more of air. The result is that not only does it occupy an excessive amount of space for a given weight of carbon black, but it cannot be handled easily, because of its fugitive nature, since slight movement or air currents will blow particles thereof away, thus causing not only loss of material, but injury to machinery, the health of the workmen, etc.

Various methods have heretofore been suggested for overcoming these objectionable features. In some cases, liquids, such as water, gasoline, and tar have been employed in order to take up the occluded or adsorbed gases or air on the surfaces of the particles, thereby permitting the particles to have more intimate contact with one another, the liquids being in most cases volatilized or driven off, after the carbon black has been treated.

Other methods involve the compacting of the carbon black by mechanical methods into masses of desired sizes, or small lumps.

Our invention has for its object the provision of a method for removing both the occluded and adsorbed gases and air from carbon black particles, without the necessity of employing liquids.

Another object of our invention is to provide an improved method for forming small lumps of carbon black.

Some forms of apparatus for practising our invention are shown in the accompanying drawings wherein Figure 1 is an elevational view, partially in section, of carbon black treating apparatus; Fig. 2 is a view taken on the line II—II of Fig. 1; Fig. 3 is a view taken on the line III—III of Fig. 2, and Fig. 4 is a vertical sectional view through a modification of the structure of Fig. 1.

Referring first to Figs. 1 to 3, we show a vacuum chamber 6 that may be of sheet metal or other suitable form, and may be of sufficient size to normally contain several hundred pounds of carbon black, in which case braces 7 will be provided for stiffening the chamber or casing, and permitting it to be made of lighter gauge metal than otherwise would be required. Suction pipes 8 communicate with the interior of the chamber 6 and are connected to a pipe 9 to which a suitable form of vacuum pump (not shown) is connected. A plurality of suction pipes 8 are desirable so as to reduce danger of so localizing flow from the chamber under suctional force as to perhaps cause withdrawal of carbon black from the chamber.

A conveyer conduit 10 discharges into the chamber 6 and contains a conveyer screw 11 driven from a suitable source of power. A feed hopper 12 discharges into the conveyer, and sufficient carbon black is maintained in the hopper 12 and the conduit 10 to provide, in effect, a seal against the entrance of atmospheric air to the chamber. A lid will be provided for the hopper 12 to seal the same against entry of flow of air to the vacuum chamber when desired, and in case the volume of carbon black in the hopper is insufficient to insure air seal.

Full vacuum force may be maintained within the chamber 6 by any suitable commercial form of evacuating pump which usually will readily reduce the atmospheric pressure within a chamber by about 90% to 95%. The chamber 6 has a trough-like bottom 13 through which extends a shaft 14 that is driven from a sprocket wheel 15, from a suitable source of power. The shaft 14 carries propeller vanes 16 that are set on an angle so as to advance the material toward the discharge outlet 19 of the trough. The propeller vanes are employed in preference to a screw, because they will effect greater agitation of the carbon black and consequently better exposure of the same to the action of the vacuum in the chamber 6.

Shafts 17 and 18 are mounted above the shaft 14 and are driven from the shaft 14 through suitable sprocket wheels. The shafts 17 and 18 carry vanes or plates 20 and 21, respectively, that pass between each other during rotation of the shafts, and also pass in proximity to the vanes 16, preferably having only slight clearance with the vanes 16. The vanes or plates 20 and 21 also serve to agitate the carbon black so as to loosen the same and expose it more completely to the suctional force in the upper portion of the chamber.

The carbon black level is preferably maintained below the level of the conduit 10, so that the carbon black will gravitate to the agitators. In operating apparatus of this character, we have found that even with no agitation of the carbon black, the application of a vacuum to the gravitating material and at the surface of a body of the material will result in escape of most of the air, the action of the vacuum being strikingly apparent, because of the pumping action which occurs. The carbon black will be pushed up into small bulb-like masses after the manner of boiling porridge until the bubbles of air escape, as the steam escapes from porridge or boiling water. The agitation above-referred to, of course, facilitates the escape of air.

The chamber 6 is sealed against the entry of air from either the inlet or the discharge sides thereof, so that there is no pronounced air current through the suction pipes 8, and consequently there is little or no loss of carbon black through those pipes. The shafts 14, 17 and 18 are ordinarily driven rather slowly, to avoid heating of the carbon black. However, when it is desired to form the carbon black into lumps, the shafts will be driven at such great speed as to develop a temperature of perhaps 400° F., in the carbon black, and therefore cause the particles to adhere together in the form of lumps which will be limited in size by the spacing between the vanes or blades 20—21, and the blades 16. The temperature referred to would be considerably increased, by increasing the speed of the shafts, in cases where we desire particles of greater hardness.

From the discharge pipe 19, the carbon black enters a chamber 23 that may be inclined downwardly and in turn discharges into hoppers or bins 24. If the chamber 23 is of short length and not many hoppers employed, no conveyer will be necessary, but for larger installations, a screw conveyer can be provided for advancing the material along the chamber 23. The bins 24 have discharge spouts 25 and each is provided with a valve 26 for controlling the admission of carbon black to the bin, and a valve 27 for controlling discharge from the bin. When the valve 26 of one bin is opened to admit carbon black from the chamber 23, the other valves 26 will be closed, in order to not only prevent flow of carbon black to their respective bins 24, but to shut off entry of air to the chamber 23. When a valve 26 is closed, its associated discharge valve 27 can be opened to permit the filling of bags or other containers in which the carbon black is packed for shipment.

We have found that by simply extracting the air from the carbon black and without forming the same into lumps, we are enabled to place 60 lbs. of the carbon black in a bag that holds only 12½ lbs. of carbon black in its natural or untreated condition.

Referring now to Fig. 4, we show a somewhat different form of apparatus for withdrawing air from carbon black. In this case, a vacuum chamber 30 is provided with suctional outlets 31. A filling pipe or conduit 32 conducts the carbon black from a conveyer conduit 33 to the suction vacuum chamber, the conduit depending into the chamber 30 to serve as a baffle. Material is advanced upwardly from the conduit 33 by an elevator screw 34 which receives the material from a screw conveyer 35. A charging bin 36 is kept partially filled with carbon black so as to maintain an air seal, and discharges to the conveyer 35. The conveyers 34 and 35 are driven from a shaft 37 that is in turn driven from a suitable source of power.

A rotatable brush 38 is mounted in the conduit 32 and has its shaft extending to a point exteriorly of the conduit, so that it can be driven by a sprocket chain 39 through suitable bevel gearing 40, from the shaft of the elevator screw 34. The brush 38 has bristles of wire or other suitable material, and serves to break up or scatter the carbon black as it gravitates through the pipe 32 to the chamber 30, thus more effectively exposing the carbon black particles to the action of the vacuum.

In this form of apparatus, as in Figs. 1 to 3, the outflow of air through the suction pipes 31 is of such small velocity that no substantial quantities of carbon black will be drawn from the chamber 30. Most of the air will have been withdrawn from the carbon black before the black emerges from the lower end of the baffle pipe 32.

The shaft 37 carries vanes 42 which advance the carbon black through a conduit 43 to a discharge pipe 44. The discharge pipe 44 is controlled by a suitable valve 45, and a plurality of these pipes may be employed after the manner shown in Fig. 1, so that the bag-filling operations and the vacuumizing operations can be simultaneously performed.

We claim as our invention:—

1. The method of densifying carbon black that contains entrained air, which comprises introducing it in the form of a loose stream into a chamber which has been and is being maintained under substantially complete vacuum, while withdrawing said entrained air from the chamber and preventing an inflow of an air stream thereto, and mechanically propelling the carbon black from said chamber into a receptacle while maintaining it out of contact with the atmosphere, the subjection of the carbon black to the vacuum and mechanical forces being carried to the point that the apparent volume thereof is so reduced that approximately 60 lbs. of carbon black will occupy no more space than 12½ lbs. thereof in its natural condition.

2. The method of densifying carbon black that contains entrained air, which comprises advancing a loose stream of the carbon black into a chamber which has been and is being maintained under substantially complete vacuum, while preventing the flow of an air stream into the chamber, and while withdrawing air from the chamber, and discharging the carbon black from the chamber into a receptacle, in the form of a stream which is sealed against contact with the atmosphere, the vacuum and discharge forces being such as to so reduce the apparent volume of the carbon black that 60 lbs. of the treated black will occupy no more space than 12½ lbs. of the carbon black in its natural condition.

3. The method of densifying carbon black that contains entrained air, which comprises introducing a loose stream of carbon black into a chamber and discharging the same therefrom in a stream, while maintaining a substantially complete vacuum condition within the chamber and preventing flow of an air stream into said chamber along the paths of said streams, subjecting the carbon black to a mechanical compacting force while in the chamber and under substantially complete vacuum, which will so reduce the apparent volume of the carbon black that 60 lbs. of the treated black will occupy no more space than 12½ lbs. of the carbon black in its natural condition.

4. The method of densifying carbon black that contains entrained air, which comprises introducing it in a fluffy condition into a chamber that has been and is being maintained under substantially complete vacuum, and mechanically propelling it from said chamber, in the form of a confined stream, while maintaining a vacuum condition within said chamber and preventing flow of an air stream into said chamber, the vacuum and discharge forces being such as to so reduce the apparent volume of the carbon black that 60 lbs. of the treated black will occupy no more space than 12½ lbs. of the carbon black in its natural condition.

5. The method of densifying carbon black that contains entrained air, which comprises introducing carbon black in a fluffy condition into a chamber wherein a substantially complete vacuum exists, at a point to effect gravitation thereof to the bottom of the chamber, and then mechanically propelling it from the chamber in a confined stream, while evacuating air from the chamber so as to maintain a substantially complete vacuum therein and while maintaining the chamber sealed against the admission of an air stream, the vacuum and discharge forces being such as to so reduce the apparent volume of the carbon black that 60 lbs. of the treated black will occupy no more space than 12½ lbs. of the carbon black in its natural condition.

JOSEPH HARTMAN.
WILLIAM A. KNAPP.